March 21, 1961  W. J. BUCHANAN, JR  2,975,646
DEVICE FOR ADJUSTING SCREW TAKE-UPS
Filed April 29, 1960

United States Patent Office 2,975,646
Patented Mar. 21, 1961

2,975,646

DEVICE FOR ADJUSTING SCREW TAKE-UPS

William J. Buchanan, Jr., Glasgow, W. Va., assignor to Chain Belt Company, Milwaukee, Wis., a corporation of Wisconsin Filed Apr. 29, 1960, Ser. No. 25,606

4 Claims. (Cl. 74—242.14)

This invention relates to traveling water screens and the like which require the periodic adjustment of the tension of the parallel chains which carry the individual screens or screen baskets operating over upper and lower sprockets.

The ends of the drive shaft to which the upper sprockets are fixed are journaled in bearings supported for vertical movement and individual adjustment by take-up screws fitted with nuts which are turnable to raise and lower the respective ends of the shaft. Each nut is supported by a thrust bearing which rests on the frame of the water screen and is shaped to receive a removable capstan for turning the nut with a bar.

Heretofore the proper adjustment of the tension of the chains in traveling water screens has been a matter of trial and error although load sensitive units have been devised to be assembled on the take-up screws beneath the bearings whereby the proper adjustment of the chains may be determined. However, the permanent installation of the load sensitive units referred to for each screen is not practicable because of the cost of the individual units and because they then are exposed to damage and weathering and in a few years may lose the sensitivity necessary for their usefulness.

The regular removal of the capstan nut for the temporary placement of the load sensitive units on each of the two take-up screws requires blocking up the headshaft while each nut is removed and involves considerable inconvenience and some hazard. Both nuts must be removed first for installation of the units and again for the removal of the units.

According to the present invention two such units and only two capstans and thrust bearings are required for any number of screens in a given installation. The take-up screws are fitted solely with supporting nuts which may be the capstan nuts as will be described hereinafter or the supporting nuts may be plain or knurled nuts. The two thrust bearings referred to are employed for adjustment purposes only and the chains are then only adjustable with the apparatus of the invention and such adjustment can then be made a regular procedure.

The present invention provides cages which fit over the supporting nuts for temporarily supporting the load sensing units placed over the screws to rest on the cages. The bearings and capstans are then assembled on the take-up screws over the load sensing units and the load is lifted from the supporting nuts. Apertures in the sides of the cages allow the nuts to be turned within the limits allowed by the internal dimensions of the cages and the operator is able to lower and raise the headshaft to make the desired adjustments by turning the upper nut with a bar and the lower nut by inserting the fingers through the apertures.

The drawings furnished herewith illustrate the best mode of carrying out the invention as presently contemplated and set forth hereinafter.

Figure 1:
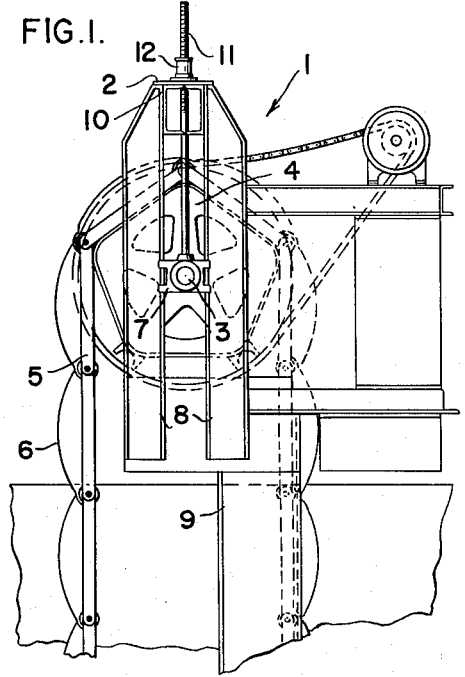
Figure 1 is a side elevation of the upper end of a traveling water screen with the housing removed and with a capstan nut mounted on the take-up screw.
Figure 2:
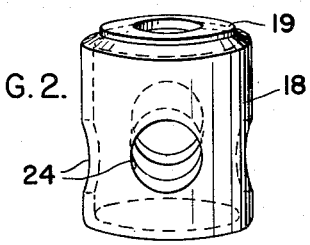
Fig. 2 is a perspective view of the cage which is adapted to be assembled on the take-up screw over the supporting nut.

The upper end of the traveling water-screen unit 1 is shown in Figure 1 and includes the upper plate 2 extending from the side of the unit shown in the figure to the opposite side which is identical in construction to the side shown and described hereinafter. The shaft 3 extending across the upper end of the unit carries spaced sprockets including the sprocket 4, which support parallel endless chains including the chain 5. The lower ends of the chains operate over aligned sprockets, not shown, located a considerable distance below shaft 3 and the chains carry the series of screens 6.

The adjustment of the tension of the chains is effected by raising or lowering shaft 3 and each end of the shaft is similarly supported and adjusted. The end of shaft 3 shown in Fig. 1 is journally supported in the bearing block 7 which is movable vertically between the parallel vertical guides 8. The lower ends of guides 8 are fixed to frame 9 of the unit and the upper ends support the corresponding end of cross-beam 10 supporting plate 2. The take-up screw 11 is fixed at its lower end to bearing block 7 and extends upwardly between guides 8 and through corresponding openings in plate 2 and cross-beam 10.

The upper end of the take-up screw 11 is fitted with the capstan nut 12 which rests on the plate 2.

The adjustment of shaft 3 so that only the desired or minimum amount of tension is applied to the chains is accomplished by means of load-sensitive units including the unit 16 having a terminal device 17 for connection to a suitable indicating means not shown.

The present invention eliminates the need of blocking up the shaft in order to place unit 16 on take-up screw 11 beneath nut 12 and provides the use of the cage 18 shown in Figs. 2, 3, and 4–7. Cage 18 is of cylindrical form and has an inner dimension sufficiently larger than nut 12 to fit easily thereover as shown in the drawings and so that the lower annular face of the cage rests on plate 2. The closed top 19 of cage 18 is provided with a central bore just large enough to allow take-up screw 11 to pass easily therethrough.

Cage 18 is assembled on take-up screw 11 and over nut 12 and load-sensing unit 16 is then assembled on the screw to rest on top 19 of the cage. The thrust bearing 21 is placed on top of unit 16 and the temporary adjustment nut 22 fitted with the capstan 23 is then threaded on take-up screw 11 to engage bearing 21.

Figure 3:
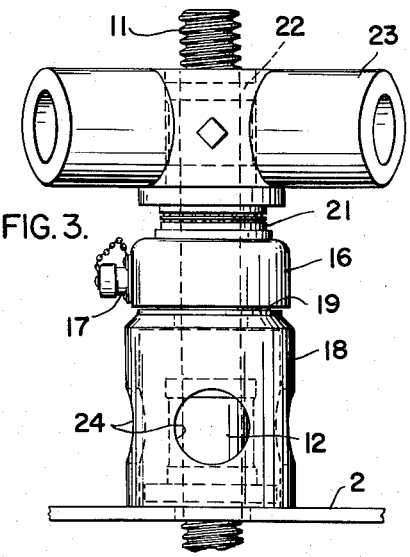
Fig. 3 is an enlarged side elevation of the load-sensing unit, the thrust bearing and the capstan assembled on the upper end of the take-up screw and above the cage shown in Figure 2. The capstan has been turned to lift slightly the nut inside the cage.
Figure 4:
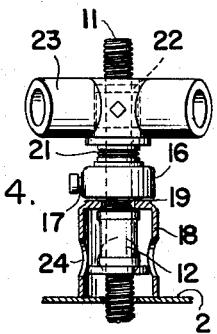
Fig. 4 is a view similar to Fig. 3 at reduced scale and with the cage broken away and sectioned to show the nut raised inside the cage to allow subsequent lowering of the take-up screw.
Figure 5:
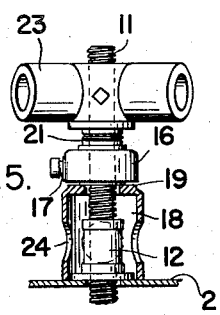
Fig. 5 is a view similar to Fig. 4 and shows the take-up screw lowered for the start of the adjustment procedure.
Figure 6:
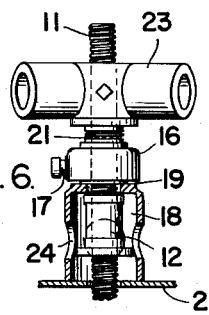
Fig. 6 is a view similar to Fig. 5 with the cage broken away and in section and showing the take-up screw and nut raised to the position providing the desired chain tension.

Each end of shaft 3 is raised and lowered simultaneously to maintain the proper alignment of the shaft by identical means as described and by the use of the identical procedure which includes first raising shaft 3 slightly as shown in Fig. 3 to lift nut 12 from plate 2. If the adjustment of shaft 3 requires lowering the shaft to be sure of first ascertaining the dead-weight load of the chain, nut 12 is then turned up within cage 18 as shown in Fig. 4. The apertures 24 in cage 18 are large to allow the operator to insert his fingers therein and turn the nut on screw 11 as required. Thereafter, it is merely necessary to raise shaft 3 until the load on unit 16 is indicated to be greater than the dead-weight load of the chain screens and upper sprockets, as shown in Fig. 6.

Figure 7:
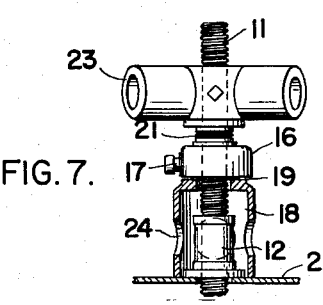
Fig. 7 is a view similar to Fig. 6 showing the take-up screw in the position for the desired chain tension and with the supporting nut turned down to support the take-up screw and head shaft upon removal of the capstan.

When the shaft has been raised to the desired height, the nut 12 inside the cage is then turned down as tight as possible against plate 2 and as shown in Fig. 7. As may be otherwise determined, the last described positioning of nut 12 may be the final adjustment or nut 12 may be set a given fraction of a turn above plate 2 to compensate for any factors extraneous of the procedure described and the present invention. In either case, capstan 23 with nut 22, bearing 21, unit 16, and cage 18 may then be removed. Two cages are required for each of the two take-up screws of each traveling water-screen and greatly facilitate the use of the two load sensing units which must be assembled on the take-up screws. Two such cages and the duplicate bearings and capstan nuts allow one set of two load sensing units to be readily moved from one to another of any number of traveling water screens of a given installation.

Various modes of carrying out the invention are contemplated as within the scope of the following claims particularly pointing out and distinctly claiming the subject matter which is regarded as the invention.

I claim:

1. A device for use with an adjustment nut and load sensing means for applying the load of a take-up having a projecting screw and external nut to said load sensing means separately of the take-up nut, comprising a cage adapted to fit over the take-up nut and to support said means, said cage having apertures allowing the take-up nut to be turned while the load is applied to said sensing means.

2. A device to fit a take-up having a frame, an external take-up screw and take-up nut, and for use with an adjustment nut and load sensing means for applying the load of the take-up to said load sensing means independently of the take-up nut, comprising a cage dimensioned to fit over the take-up nut and to rest on the frame of the take-up and support said means, said cage having apertures allowing the take-up nut to be turned while the load is applied to said sensing means by means of the adjustment nut turned on the take-up screw.

3. Adjustment means for a traveling water screen and the like which include a frame having a vertical take-up screw and a nut threaded on the take-up screw and supporting the corresponding end of a shaft, a cage adapted to fit over said nut and having an upper opening for the upper end of the take-up screw and a lower planiform face for resting on the upper frame and apertures allowing the operator to insert his fingers in said cage to turn said nut, the upper end of said cage being adapted to support a load sensing means temporarily assembled on the upper end of the take-up screw with a second nut whereby said cage provides the support of the take-up screw and shaft separately of the first nut for the adjustment of the screen according to the tension indicated by the load sensing means.

4. Adjustment means for a traveling water screen which includes a frame having a vertical take-up screw and a nut threaded on the take-up screw and supporting the corresponding end of the headshaft of the water screen, a cage adapted to fit over said nut and having an upper opening for the upper end of the take-up screw and a lower planiform face for resting on the upper frame of the water screen and apertures allowing the operator to insert his fingers in said cage to turn said nut, said cage having a height allowing the take-up nut limited vertical movement therein by turning and the upper end of said cage being adapted to support a load-sensing means temporarily assembled on the upper end of the take-up screw with a second nut whereby said cage provides the support of the take-up screw and headshaft of the traveling water screen separately of the first nut for the adjustment of the screen according to the tension indicated by the load sensing means.

References Cited in the file of this patent

UNITED STATES PATENTS

| | | |
|---|---|---|
| 98,848 | Chanute et al. | Jan. 18, 1870 |
| 1,717,359 | Aldrich | June 18, 1929 |
| 2,443,267 | Owens | June 15, 1948 |
| 2,561,318 | Ruge | July 17, 1951 |